US008662106B2

(12) United States Patent
Reumschussel et al.

(10) Patent No.: US 8,662,106 B2
(45) Date of Patent: Mar. 4, 2014

(54) HYDRAULIC TRIP UNIT FOR A VALVE UNIT IN A PRIME MOVER PLANT, ESPECIALLY FOR A FAST-ACTING SHUT-OFF VALVE OF A TURBINE PLANT

(75) Inventors: Carsten Reumschussel, Grenzach-Wyhlen (DE); Markus Brandli, Mellingen (CH); Claus Eifert, Waldshut-Tiengen (DE); Daniel Pfammatter, Montagnola (CH); Silvano Steib, Vaglio (CH)

(73) Assignee: Alstom Technology Ltd, Baden (CH)

( * ) Notice: Subject to any disclaimer, the term of this patent is extended or adjusted under 35 U.S.C. 154(b) by 964 days.

(21) Appl. No.: 12/569,495

(22) Filed: Sep. 29, 2009

(65) Prior Publication Data

US 2010/0078089 A1 Apr. 1, 2010

(30) Foreign Application Priority Data

Sep. 30, 2008 (CH) ....................................... 1549/08

(51) Int. Cl.
*F16B 13/04* (2006.01)

(52) U.S. Cl.
USPC .................... 137/596.15; 137/596.16; 251/29

(58) Field of Classification Search
USPC ................. 251/29, 30.01, 30.02; 137/596.15, 137/596.16, 596.14
See application file for complete search history.

(56) References Cited

U.S. PATENT DOCUMENTS 4,637,587 A 1/1987 Kuhnlein
5,143,119 A 9/1992 Plangger
5,217,199 A * 6/1993 Frey ................................ 251/29
5,280,807 A 1/1994 Frey et al.
5,848,779 A * 12/1998 Murbe et al. .................... 251/29
6,155,282 A * 12/2000 Zachary et al. ................... 137/1
6,435,202 B2 * 8/2002 Zachary et al. ................... 137/1
6,478,048 B2 * 11/2002 Hays ............................ 137/557
7,322,270 B2 * 1/2008 Schmieding .................... 91/424
2006/0042250 A1 3/2006 Schmieding

FOREIGN PATENT DOCUMENTS

DE 3432890 A1 1/1986
DE 102004042891 B3 10/2005
EP 0433791 A 6/1991
EP 0540963 A 5/1993

* cited by examiner

*Primary Examiner* — John Bastianelli
*Assistant Examiner* — Andrew J Rost
(74) *Attorney, Agent, or Firm* — Buchanan Ingersoll & Rooney PC

(57) ABSTRACT

A hydraulic trip unit for a valve unit in a prime mover plant is described, with monitoring passages which are grouped together in a hydraulic block and interconnected forming a 2 out of 3 circuit, of which each monitoring passage is provided with a solenoid valve unit, with a power oil line connection which is provided on the hydraulic block and from which an emergency oil passage and an auxiliary emergency oil passage extend inside the hydraulic block, of which the emergency oil passage can be connected to the valve unit and the auxiliary emergency oil passage is connected via connecting lines to a solenoid valve unit in each case, wherein a first connecting line feeds a first and third solenoid valve unit, a second connecting line feeds the second and a first solenoid valve unit, and a third connecting line feeds the third and second solenoid valve unit.

12 Claims, 5 Drawing Sheets

HYDRAULIC TRIP UNIT FOR A VALVE UNIT IN A PRIME MOVER PLANT, ESPECIALLY FOR A FAST-ACTING SHUT-OFF VALVE OF A TURBINE PLANT

FIELD OF INVENTION

The invention relates to a hydraulic trip unit for a valve unit in a prime mover plant, especially for a fast-acting shut-off valve of a turbine plant, with monitoring passages which are grouped together in a hydraulic block and interconnected forming a 2 out of 3 circuit, of which each monitoring passage is provided with a solenoid valve unit, with a power oil line connection which is provided on the hydraulic block and from which an emergency oil passage and also an auxiliary emergency oil passage extend inside the hydraulic block, of which the emergency oil passage can be connected to the valve unit and the auxiliary emergency oil passage is connected via connecting lines to a solenoid valve unit in each case, wherein a first connecting line feeds a first and third solenoid valve unit, a second connecting line feeds the second and first solenoid valve unit, and a third connecting line feeds the third and second solenoid valve unit.

BACKGROUND

A hydraulic trip unit of the type previously referred to is the subject of DE 34 32 890 C2 which serves for the direct actuation of a fast-acting shut-off valve for a turbine plant, in which the monitoring of the hydraulic actuating pressure of the fast-acting shut-off valve is undertaken by three solenoid valves which are interconnected in a wire-free manner and interconnected in the style of a 2 out of 3 circuit. The known trip unit in this case trips as long as at least two of three solenoid valves change into a deenergized state, i.e. they revert to the respective neutral position. In the event of a trip, a portion of oil which flows along a control oil line which is connected directly to the fast-acting shut-off valve and in dependence upon the oil pressure which prevails along the control oil line enables an actuating element to operate, directly reaches the drain via a by-pass line which is provided by two solenoid valves, so that the control oil pressure along the control oil line abruptly reduces in the event of a trip as a result of which actuating means which are in the fast-acting shut-off valve are correspondingly activated for closing the said fast-acting shut-off valve. If at least two of the three solenoid valve units are energized, then no bypass passage from the control oil line to the drain is opened by the solenoid valves so that the control oil pressure along the control oil line remains uninfluenced. The known trip unit which is realized within the scope of a hydraulic block furthermore has manually operable or automatically working monitoring units for functional testing of the individual solenoid valves even during normal operation.

The advantage of the known trip unit is to be seen as that of the entire trip unit not being automatically activated in the case of there being a defect of a single solenoid valve as a result of which a turbine trip would occur, rather it being possible to operate the solenoid valves individually in sequence in a deenergized state in order to be able to test the correct function of the individual solenoid valves during turbine operation. In the case of the known trip unit, however, the only low throughflow capacity is disadvantageous. For modernizing hydraulic systems which are already in operation in prime mover plants it especially requires taking into consideration large volumetric flows at lower pressures which are to be controlled by the solenoid valves, which requires larger cross sections and throughflow capacities.

Furthermore, EP 0 540 963 B1 describes a feed circuit for a split hydraulic system which enables a pressurized fluid to be fed along a main line and which is provided for operating fast-acting shut-off valves and/or steam control valves which for example control the steam feed of a steam turbine. For feeding the pressurized fluid into the corresponding main line the known feed circuit makes provision for at least one sequence valve, which is formed as a slide valve, with which is associated a plate valve arrangement acting as a discharge booster. In the case of the known feed circuit, disturbing pressure shocks in the feed system can be largely excluded in all operating states, furthermore high throughflow capacities, as are necessary for use in steam turbines and gas turbines, can be achieved with this. On the other hand, the proposed feed circuit is complicated in its construction, however, and requires expensive components which not least bring about considerable costs.

SUMMARY

The present disclosure is directed to a hydraulic trip unit for a valve unit in a prime mover plant. The trip unit includes monitoring passages, which are grouped together in a hydraulic block and are interconnected forming a 2-out-of-3 circuit, of which each monitoring passage is provided with a solenoid valve unit. The trip unit also includes a power oil line connection, which is provided on the hydraulic block and from which an emergency oil passage and an auxiliary emergency oil passage extend inside the hydraulic block. The emergency oil passage can be connected to the valve unit and the auxiliary emergency oil passage is connected via connecting lines to a solenoid valve unit in each case. A first connecting line feeds a first and third solenoid valve unit, a second connecting line feeds a second and the first solenoid valve unit, and a third connecting line feeds the third and second solenoid valve unit. The auxiliary emergency oil passage and the emergency oil passage are separated from a drain by a plate-type drain valve in such a way that the auxiliary emergency oil passage and the emergency oil passage adjoin the plate-type drain valve with opposite directions of action in each case.

BRIEF DESCRIPTION OF THE DRAWINGS

The invention is subsequently exemplarily described without limitation of the general inventive idea based on exemplary embodiments with reference to the drawings. In the drawings.

DETAILED DESCRIPTION OF THE PREFERRED EMBODIMENTS

Introduction to the Embodiments

The invention is based on the object of providing a trip unit for a valve unit in a prime mover plant, especially for a fast-acting shut-off valve of a turbine plant, in such a way that on the one hand high throughflow capacities which are as high as possible can be achieved, and at the same time the constructional and component-engineering expenditure is to be kept as low and cost-effective as possible. Naturally, it is necessary to unconditionally meet the high safety standards of trip units which have been in use up to now.

Starting from a known hydraulic trip unit according to the aforementioned DE 34 32 890 C2, which has a monitoring passage integrated into a hydraulic block and connected to each of the three solenoid valves via check valves, and also makes provision for a power oil line connection which is provided on the hydraulic block and from which an emergency oil passage and also an auxiliary emergency oil passage extend inside the hydraulic block, of which the emergency oil passage can be connected to the valve unit of the prime mover plant and the auxiliary emergency oil passage is connected via connecting lines to a solenoid valve unit in each case, wherein a first connecting line feeds a first and third solenoid valve unit, a second connecting line feeds a second and the first solenoid valve unit, and a third connecting line feeds the third and second solenoid valve unit, the hydraulic trip unit according to the disclosure is characterized in that the auxiliary emergency oil passage and also the emergency oil passage are separated from a drain by a plate-type drain valve in such a way that the auxiliary emergency oil passage and also the emergency oil passage adjoin the plate-type drain valve with opposite directions of action in each case.

The combination according to the solution of a 2 out of 3 circuit of preferably three 4/2 directional slide valves in each case in the form of solenoid valve units with a plate-type drain valve enables a simple and inexpensive construction, especially in the form of a two-section housing, by the 2 out of 3 circuit with the three solenoid valve units being accommodated in a first housing section and the plate-type drain valve being realized in a second housing section, wherein the two housing sections are combined with each other via a suitable joint connection, for example by way of a threaded connection.

For detailed explanation of the hydraulic trip unit which is formed according to the solution and also of the advantageous development forms which are associated with it, the drawings may be additionally referred to.

DETAILED DESCRIPTION

Figure 1:
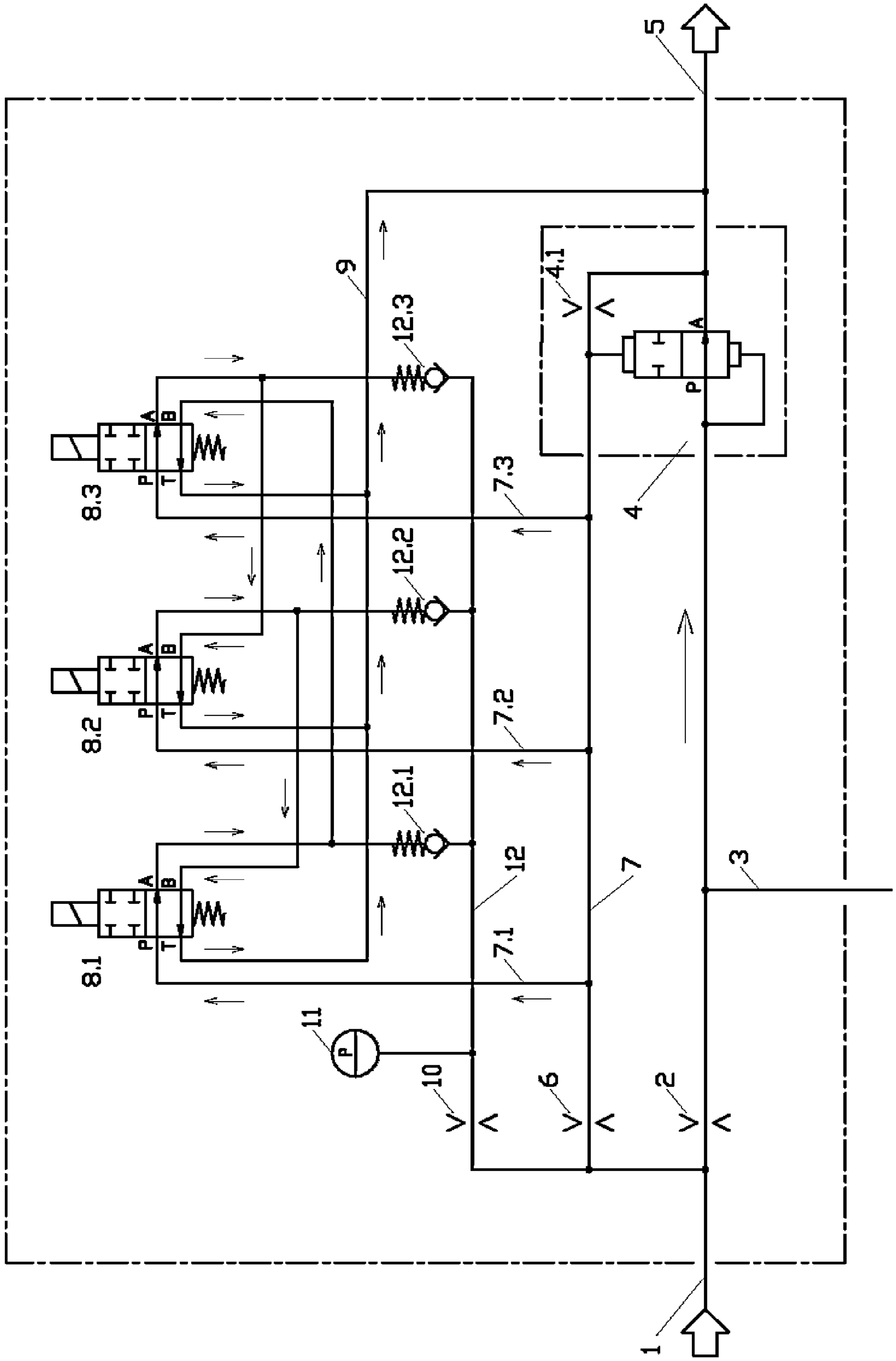
FIG. 1 shows circuit topology of a hydraulic trip unit in the deenergized neutral state.

FIG. 1 shows the circuit topology of a preferred exemplary embodiment of a hydraulic trip unit which is formed according to the solution, which is supplied with power oil via a power oil line, and from which an emergency oil line 3 branches off to an actuating valve unit, which is not shown, for a turbine, for example in the form of a fast-acting shut-off valve. Furthermore, the circuit topology makes provision for a drain 5 via which, depending upon the circuit state of the hydraulic trip unit, quantities of oil can discharge from the emergency oil passage or auxiliary emergency oil passage according to the further description.

The power oil which is fed via the power oil line 1 reaches a valve unit on the turbine side, which is not shown, via an emergency oil feed orifice 2 along the emergency oil line 3, the valve unit is activated or operated in dependence upon the oil pressure which prevails along the emergency oil line 3. The oil pressure which is established along the emergency oil line 3 depends essentially upon the valve position of a plate-type drain valve 4 into which leads the emergency oil line 3 which adjoins on one side. If the valve position of the plate-type drain valve 4 is in an open position, then the emergency oil directly reaches the drain 5 so that no oil pressure, or no significant oil pressure, can be build up along the emergency oil passage 3, as a result of which, the fast-acting shut-off valve, which is not additionally shown, of the turbine occupies the closed position and therefore the turbine plant is shut down.

Moreover, the power oil line 1, via a so-called auxiliary emergency oil feed orifice 6, is connected to an auxiliary emergency oil passage 7 from which three connecting lines 7.1, 7.2 and 7.3 branch off in each case and lead in each case to the inlet P of three 4/2 directional solenoid valve units 8.1, 8.2 and 8.3. According to the circuit topology, for example the connecting line 7.1 is connected to the first solenoid valve unit 8.1 from which the connecting line continues to the third solenoid valve unit 8.3 in order to finally lead into a drain line 9 of the solenoid valves. The second connecting line 7.2 leads through the second solenoid valve unit to the first solenoid valve unit from which it also finally leads into the drain line 9. Finally, the third connecting line 7.3 connects the solenoid valves 8.3 and 8.1 in the specified manner and similarly leads into the drain line 9. Each one of the three solenoid valve units which are interconnected in each case via connecting lines correspond in the selected terminology to a monitoring passage, which are indispensable for operational reliability of the hydraulic trip unit.

Since all the solenoid valves 8.1, 8.2 and 8.3 are deenergized in the case which is shown in FIG. 1, the oil which flows through the connecting lines 7.1, 7.2 and 7.3 flows through all three solenoid valves and finally reaches the drain line 9. Thus, for example the oil which flows along the connecting passage 7.1 in the solenoid valve 8.1 from P to A further reaches the third solenoid valve 8.3 and from there, flowing from B to T, reaches the drain of the solenoid valves 9 and finally further reaches the drain 5. On account of the open valve circuits of all the solenoid valves 8.1 to 8.3 oil pressure, by which the plate-type drain valve 4 could otherwise be able to be correspondingly operated or activated, cannot build up along the auxiliary emergency oil passage 7 which at the same time is also connected to the plate-type drain valve 4.

Finally, the power oil line 1 is connected via a test passage feed orifice 10 to a test passage 12 which is provided for test purposes of the operational functioning mode of the individual solenoid valve units 8.1, 8.2 and 8.3. As long as at least one of the solenoid valve units is deenergized, the oil which flows along the test passage 12 flows through the respective check valves 12.1, 12.2 or 12.3 to the respective deenergized solenoid valve unit, then into the drain 9 of the solenoid valves and finally into the drain 5. For example the test oil which flows through the check valve 12.1 reaches the solenoid valve 8.3 and flows via its inlet B into the outlet T into the drain line 9. A corresponding circuit provides the check valves 12.2 and 12.3. Furthermore, a pressure switch or pressure transmitter 11, which is able to detect a pressure drop which occurs along the test passage 12, is provided along the said test passage 12.

Figure 2:
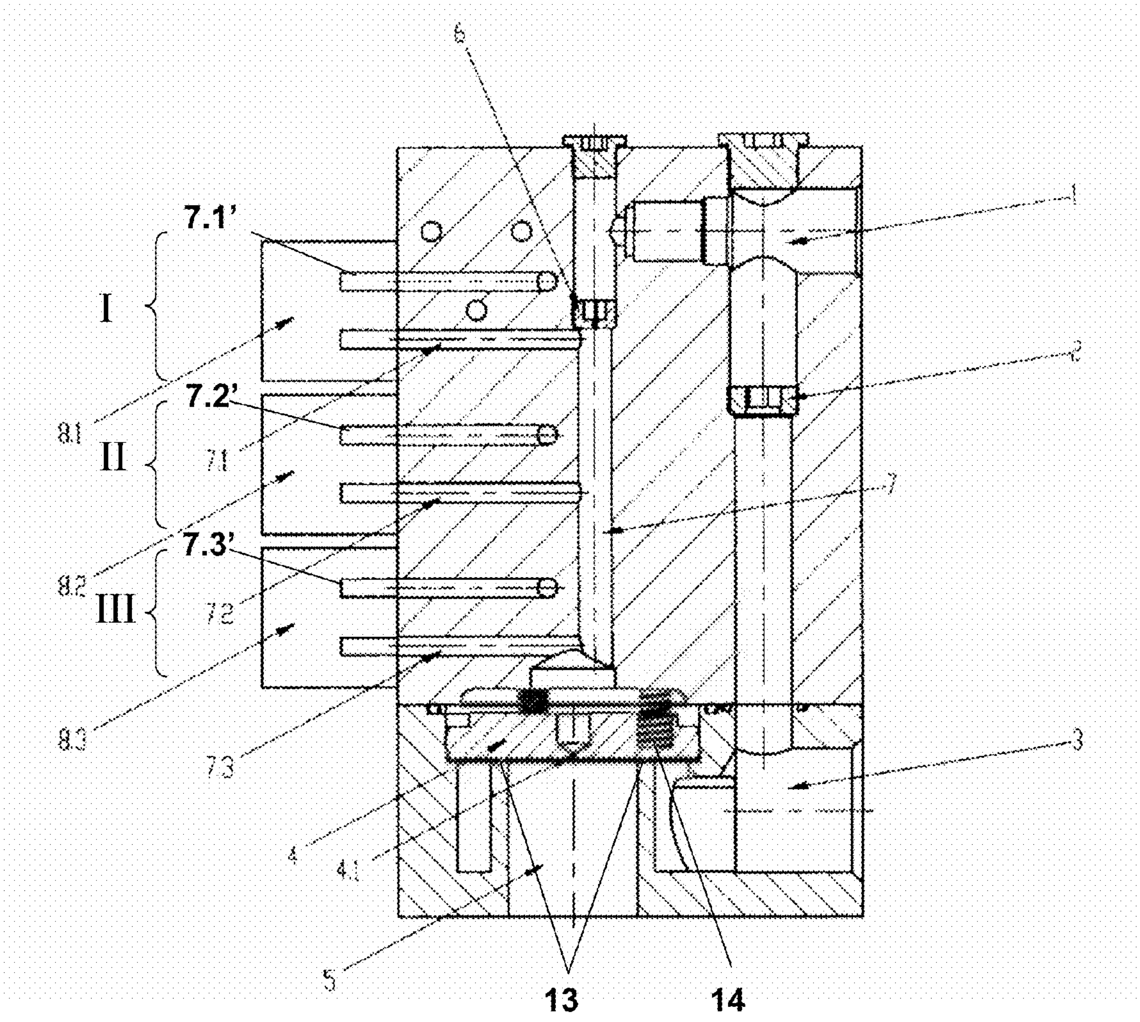
FIG. 2 shows a sectional drawing through an advantageous exemplary embodiment of a hydraulic trip unit.

In the sectional view according to FIG. 2, a possible concrete realization variant of the circuit topology which is shown in FIG. 1 is illustrated. The hydraulic trip unit which is shown in FIG. 2 essentially consists of two sections, of which the first section I comprises nearly all the previously described oil passages which are incorporated into a unitary material block, for example a stainless steel block. The second section II comprises the plate-type drain valve 4 which is likewise made from a unitary material block with the exception of an axially movably mounted plate. The two sections I and II are tightly interconnected in a separable manner, preferably via threaded connections, which are not additionally shown, with seals.

In the upper section I, which is shown in the sectional view according to FIG. 2, a connection for the power oil line 1 is provided via a side bore, on which power oil line the emergency oil passage 3 is provided in a perpendicularly branching manner and along which the emergency oil feed orifice 2 is introduced in the form of an insert piece. The safety oil passage 3 leads into the section II, upon which a connecting flange for a further line to a valve unit, which is not additionally shown, of a prime mover plant, especially to a fast-acting shut-off valve of a turbine plant, is provided on the side.

Furthermore, the power oil line 1 leads into the auxiliary emergency oil passage 7 in which an auxiliary emergency oil feed orifice 6 in the form of an insert piece is implemented for establishing the auxiliary emergency oil pressure. The connecting passages 7.1, 7.2 and 7.3 branch off from the auxiliary emergency oil passage 7 and in each case lead into the solenoid valve units 8.1, 8.2 and 8.3 which as standard modular units are connected in a fluidtight manner to the section I. The graphically represented return lines 7.1' 7.2' and 7.3' from the respective solenoid valve units 8.1 to 8.3 lead into a drain line 9, which is not shown, which is connected to the drain 5. The monitoring passages are designated I, II, III.

Figure 3:
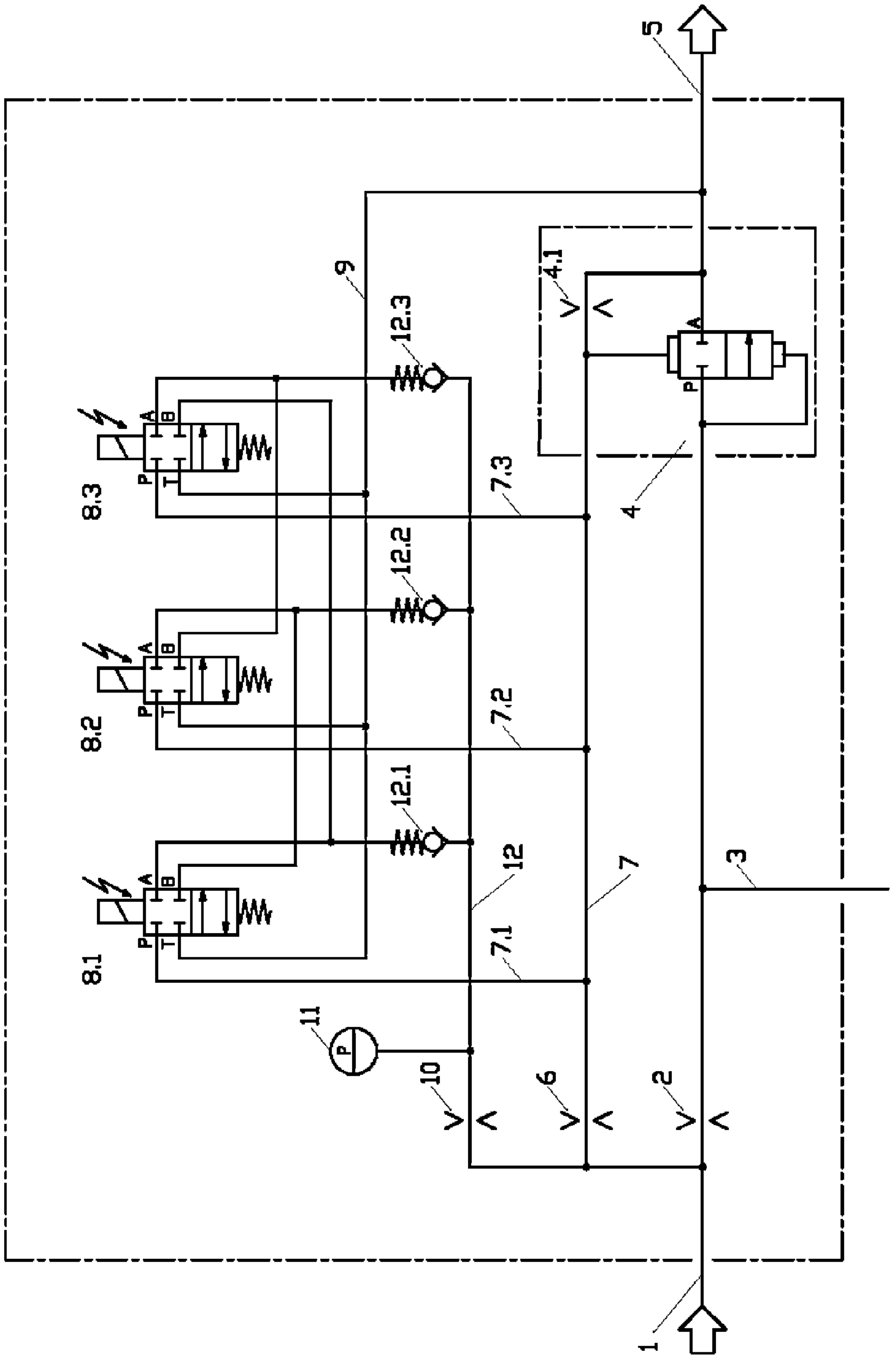
FIG. 3 shows circuit topology according to FIG. 1 in the energized state.

Likewise, the test passage 12 and also the connecting lines, which branch from the test passage 12, to the individual solenoid valve units, with the associated check valves 12.1, 12.2 and 12.3, are not evident from the illustration which is shown in FIG. 3.

The auxiliary emergency oil passage 7, by a widened passage cross section, leads to the axially movable plate of a plate-type drain valve, which is provided with the designation 4, the plate of which bears in a fluidtight manner on a lower sealing contour 13 which is provided in the section II. The plate of the plate-type drain valve 4 is basically formed in such a way that despite its longitudinal movability possible malfunctions, which are caused by tilting, are excluded. For this, the plate of the plate-type drain valve 4 is seated in a longitudinal bore with a radial clearance. The plate of the plate-type drain valve 4 is not necessarily pressed against the sealing contour 13 inside the section II by a tensioner 14, for example in the form of a spring.

As already mentioned and evident from the sectional drawing according to FIG. 2, the auxiliary emergency oil passage 7 leads via a large effective area to the upper side of the plate of the plate-type drain valve 4 so that the plate, contingent upon the oil pressure along the auxiliary emergency passage 7, is pressed in a fluidtight manner against the sealing contour 13. On the other hand, the emergency oil passage 3 lies adjacent to the underside of the plate of the plate-type drain valve 4 along the edge region of the plate, which projects radially over the sealing contour 13, of the plate-type drain valve 4 so that the oil pressure which prevails inside the emergency oil passage 3 acts upon the plate of the plate-type drain valve 4 diametrically opposite to the oil pressure along the auxiliary emergency oil passage 7. In this case, the effective area of the plate of the plate-type drain valve 4 which faces the emergency oil passage 3 is sized smaller than the effective area of the plate-type drain valve 4 which faces the auxiliary emergency oil passage 7.

For constructional reasons it is therefore obvious that the plate of the plate-type drain valve 4 is pressed in a fluidtight manner against the sealing contour 13 of the section II as long as the pressure force which acts upon the plate in the auxiliary emergency oil passage 7 by the oil pressure which prevails there is greater than that which by the emergency oil 3 is able to act from the bottom against the plate on its annular edge region. This is then the case if at least two solenoid valves are energized and in this way a direct discharging of the auxiliary emergency oil into the drain line 9 is prevented. In this case, a pressure builds up along the auxiliary emergency oil line 7 which presses the plate of the plate-type drain valve 4 into the lower position which is shown in FIG. 2. In this case the emergency oil passage 3 is supplied with power oil, as a result of which a fast-acting shut-off valve (not shown) is finally held in the open position. If on the other hand the pressure force upon the plate of the plate-type drain valve 4 from the bottom prevails in relation to the pressure force which acts upon the plate of the plate-type drain valve 4 from the top, then the plate of the plate-type drain valve 4 moves vertically upwards from the sealing contour 13, as a result of which the emergency oil can discharge from the emergency oil passage 3 via the plate-type drain valve 4 directly into the drain 5. In this case, the oil pressure along the emergency oil passage 3 reduces, as a result of which a fast-acting shut-off valve spontaneously closes which ultimately leads to the shutting down of the turbine. The previous scenarios are explained in more detail with reference to the further circuit topologies.

Thus, the circuit topology which is shown in FIG. 3 represents that case in which all three solenoid valves 8.1, 8.2 and 8.3 are energized, i.e. excited. As a result of this, all three solenoid valves are transferred into a state in which all the throughflows are interrupted. Therefore, oil along the auxiliary emergency oil passage 7 cannot directly reach the drain line 9, as a result of which oil pressure can build up along the said auxiliary emergency oil passage 7. This oil pressure is able to press the plate of the plate-type drain valve 4 in a fluidtight manner against the sealing contour 13 into the position which is shown in FIG. 2 so that the oil which is present in the emergency oil passage 3 cannot discharge via the drain 5 but is guided entirely to a fast-acting shut-off valve which is not additionally shown. In this case, the turbine is in operation.

A small leakage opening, which represents a so-called leakage orifice 4.1, through which a small amount of oil can escape into the drain 5, is located centrally in the plate of the plate-type drain valve 4. This leakage ensures that warm oil is always available in the auxiliary emergency oil passage 7, as a result of which a thickening of the oil is prevented.

Figure 4:
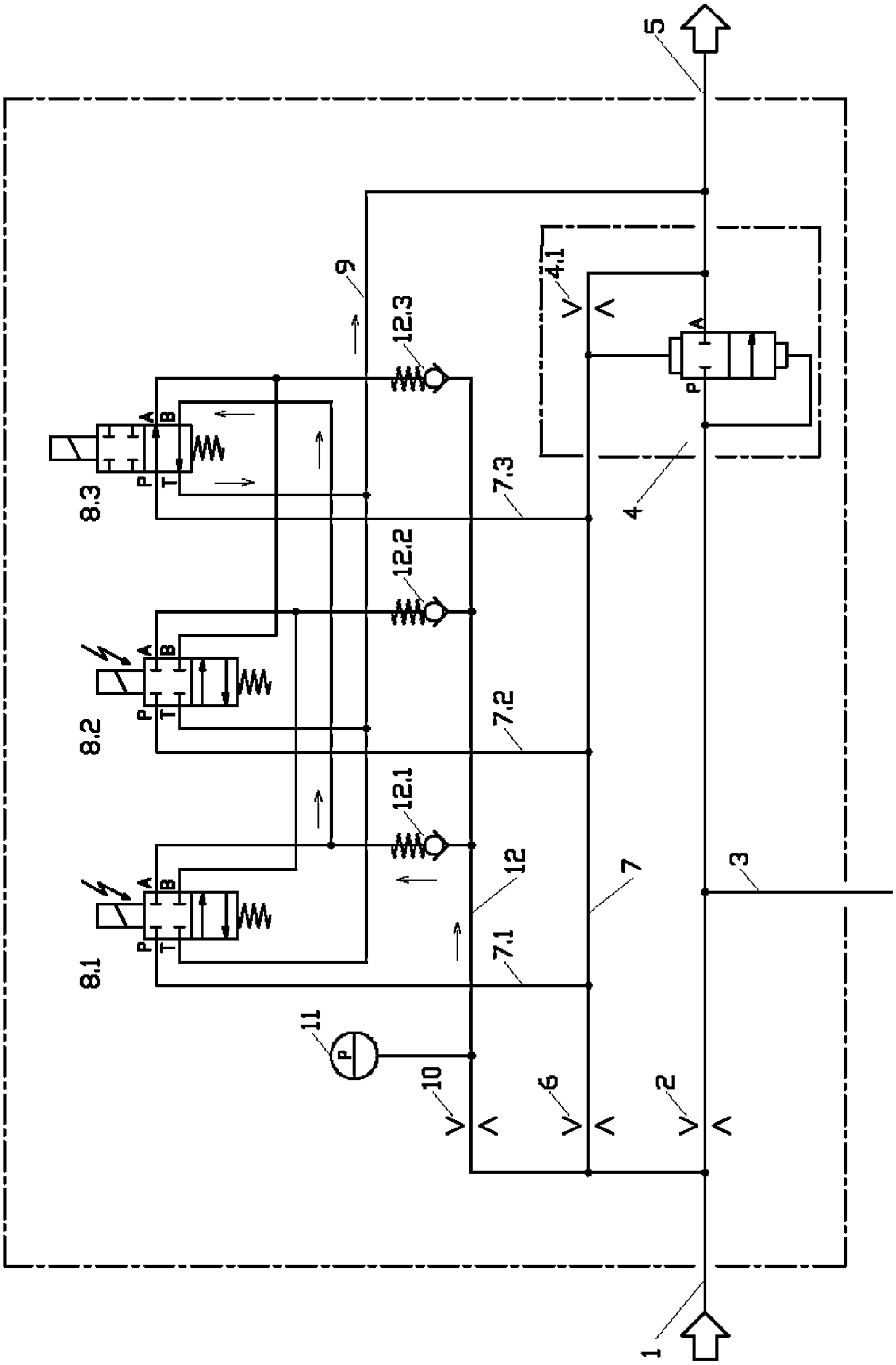
FIG. 4 shows circuit topology according to FIG. 1 with one deenergized solenoid valve.

In order to ensure the functionality of the hydraulic trip unit during the previously described normal operating case in which all the solenoid valves 8.1, 8.2, 8.3 are energized and therefore closed, each of the three solenoid valves 8.1 to 8.3 is tested in regular cycles. In so doing, the solenoid valves 8.1 to 8.3 are individually deenergized one after the other. In the exemplarily case which is shown in FIG. 4, the solenoid valve 8.3 is deenergized, but in this case oil cannot flow from P to A since the passage B to T in the second solenoid valve unit 8.2 is not open and on the other hand a backflow of oil through the check valve 12.3 is prevented. The oil in this case can discharge from the solenoid valve 8.3 exclusively via the check valve 12.1 and the passage B to T into the drain 9 and finally into the drain 5. This creates a defined pressure drop along the test passage 12 which is detected by the pressure switch or pressure transmitter 11. On the other hand, the pressure inside the auxiliary emergency oil passage 7 is not influenced, or not significantly influenced, which results in the plate-type drain valve 4 remaining in an unchanged state in the closed, i.e. lower position, so that the oil pressure in the emergency oil passage 3 is maintained and a fast-acting shut-off valve correspondingly remains in the open position.

If the pressure in the test oil passage drops below a specific value within a defined time the test is seen to be successful. The corresponding test is carried out with the other solenoid valves timewise one after the other so that the operational reliability of all the solenoid valves is always ensured.

Figure 5:
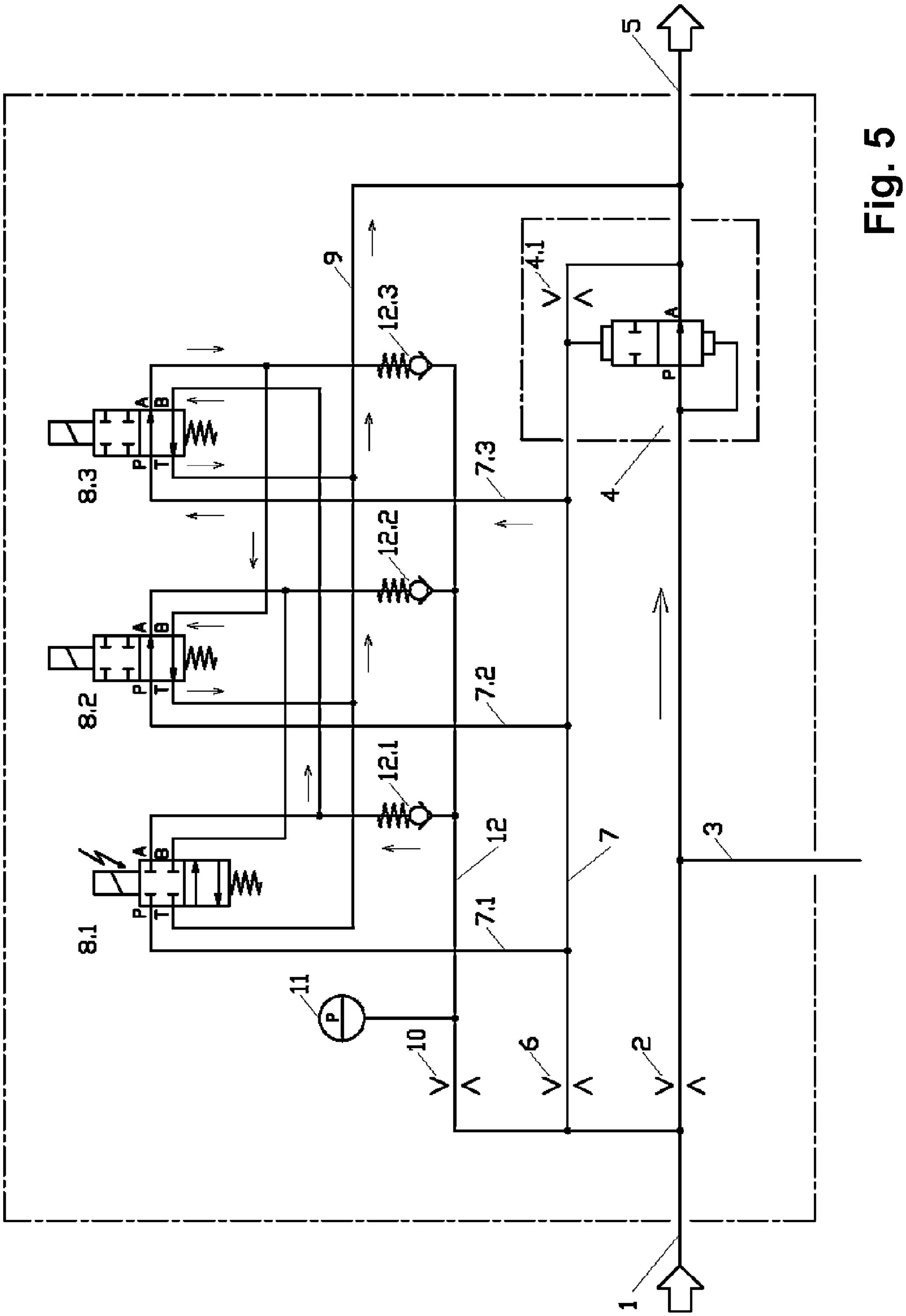
FIG. 5 shows circuit topology according to FIG. 1 with two deenergized solenoid valves.

In the case of a necessary emergency shutdown of the prime mover plant all three solenoid valves are to be deenergized. In so doing, the 2 out of 3 circuits advantageously have a fault tolerance of one, which means that any one solenoid valve unit may fail, that is to say may remain in the operating position, for example as a result of contaminant-induced seizing of the solenoid valve or a failure in the electrical actuation. The safe state, i.e. the decay of the emergency oil pressure in the emergency oil passage 3, is brought about if any two solenoid valve units are deenergized and change into the neutral state, as is illustrated in the exemplary case according to FIG. 5. In this case, the solenoid valves 8.2 and 8.3 are deenergized. The oil of the auxiliary emergency oil passage 7 in this case discharges in such a way that the oil flows along the connecting line 7.3 through the solenoid valve 8.3 from P to A and then further to the solenoid valve 8.2 since the check valve 12.3 prevents a backflow. In the solenoid valve 8.2 the oil flows through the passage B to T into the drain 9 of the solenoid valves and further into the drain 5. Since this oil drain inside the auxiliary emergency oil passage 7 leads to a significant pressure reduction the plate of the plate-type drain valve is deflected upwards and lets the oil discharge along the emergency oil passage 3 from T to A through the plate-type drain valve into the drain 5. The result is closing of the fast-acting shut-off valve and shutting down of the turbine.

As a result of the combination according to the disclosure of a 2 out of 3-way circuit of three 4/2 solenoid valve units with a plate-type drain valve, significant optimizations could be achieved with regard to the trip time, the throughflow capacity, the emergency oil residual pressure in the trip state, and also the production costs for a complete trip unit.

LIST OF DESIGNATIONS

1 Power oil line
2 Emergency oil feed orifice
3 Emergency oil line
4 Plate-type drain valve
4.1 Leakage orifice
5 Drain
6 Auxiliary emergency oil feed orifice
7 Auxiliary emergency oil passage
7.1-7.3 Connecting line, auxiliary emergency oil passage to solenoid valve unit
8.1-8.3 Solenoid valve units
9 Drain line of solenoid valves
10 Test passage feed orifice
11 Pressure switch/pressure transmitter
12 Test passage
12.1-12.3 Check valves
13 Sealing contour
14 Tensioner

What is claimed is:

1. A hydraulic trip unit for a valve unit in a prime mover plant, the trip unit comprising monitoring passages which are grouped together in a hydraulic block and are interconnected forming a 2-out-of-3 circuit, of which each monitoring passage is provided with a solenoid valve unit; a power oil line connection which is provided on the hydraulic block and from which an emergency oil passage and an auxiliary emergency oil passage extend inside the hydraulic block, of which the emergency oil passage can be connected to the valve unit and the auxiliary emergency oil passage is connected via connecting lines to a solenoid valve unit, wherein a first connecting line feeds a first and third solenoid valve unit, a second connecting line feeds a second and the first solenoid valve unit, and a third connecting line feeds the third and second solenoid valve unit, the auxiliary emergency oil passage and the emergency oil passage are separated from a drain by a plate-type drain valve in such a way that the auxiliary emergency oil passage and the emergency oil passage adjoin the plate-type drain valve with opposite directions of action on a plate of the plate-type drain valve in each case, the plate-type drain valve includes a centrally located leakage orifice which always fluidly connects the auxiliary emergency oil passage to the drain.

2. The hydraulic trip unit as claimed in claim 1, wherein an emergency oil feed orifice is provided between the power oil line connection and the emergency oil passage, and an auxiliary emergency oil feed orifice is provided between the power oil line connection and the auxiliary emergency oil passage.

3. The hydraulic trip unit as claimed in claim 2, wherein the hydraulic block is formed in one piece and comprises the power oil line connection, the emergency oil passage, the auxiliary emergency oil passage, and the connecting lines.

4. The hydraulic trip unit as claimed in claim 3, wherein the solenoid valve units, the emergency oil feed orifice and the auxiliary emergency oil feed orifice are implemented into the hydraulic block as separate modules.

5. The hydraulic trip unit as claimed in claim 1, wherein a tensioning element is provided which presses the plate-type drain valve in a fluidtight manner against a sealing contour which encompasses the drain, in the direction of action towards the auxiliary emergency oil passage.

6. The hydraulic trip unit as claimed in claim 5, wherein the emergency oil passage includes the sealing contour and on the end face side is adjacent to an edge region of the plate-type drain valve which projects over the sealing contour.

7. The hydraulic trip unit as claimed in claim 5, wherein a separate component comprises the sealing contour.

8. The hydraulic trip unit as claimed in claim 1, wherein the power oil line connection is connected via a test passage feed orifice to a test passage which is connected via a check valve to the solenoid valve units.

9. The hydraulic trip unit as claimed in claim 8, wherein a pressure sensor is arranged along the test passage downstream to the test passage feed orifice.

10. The hydraulic trip unit as claimed in claim 8 wherein the test passage is part of the hydraulic block, and the test passage feed orifice and the check valves are implemented into the hydraulic block as separate modules.

11. The hydraulic trip unit as claimed in claim 1, wherein the plate-type drain valve is formed as a separate component and comprises a section of the emergency oil passage and the drain.

12. The hydraulic trip unit as claimed in claim 1, wherein the plate-type drain valve includes a first effective plate area which faces the auxiliary emergency oil passage and which is larger than a second effective plate area which faces the emergency oil passage, and in that the first and the second effective plate areas are diametrically opposite on the plate-type drain valve.

* * * * *